United States Patent [19]

Van Der Koogh

[11] 3,860,026
[45] Jan. 14, 1975

[54] AUTOMATIC AIR VENT

[75] Inventor: Hermanus Hendrik Van Der Koogh, Hilversum, Netherlands

[73] Assignee: Industrieele Maatschaddij Zutphen B. V., Dreef 5, Zutphen, Netherlands

[22] Filed: May 29, 1973

[21] Appl. No.: 364,323

[30] Foreign Application Priority Data
Apr. 26, 1973 Netherlands ...................... 7305839

[52] U.S. Cl. ............................. 137/202, 137/415
[51] Int. Cl. ...................... F16k 45/02, F16k 31/34
[58] Field of Search ........... 137/202, 195, 501, 415, 137/614.13, 614.14

[56] References Cited
UNITED STATES PATENTS

| 701,824 | 6/1902 | Walsh | 137/202 |
| 3,402,735 | 9/1968 | Kates | 137/501 |
| 3,419,035 | 12/1968 | Hartz | 137/195 X |
| 3,602,252 | 8/1971 | Barnes | 137/501 X |
| 3,770,007 | 11/1973 | Orth | 137/501 |

Primary Examiner—Alan Cohan
Attorney, Agent, or Firm—Diller, Brown, Ramik & Wight

[57] ABSTRACT

In an automatic air vent for use in liquid-filled systems, from which air is vented through an orifice controlled by a valve actuated by a float, means are provided to ensure proper operation at high internal system pressures without needing a heavier float.

11 Claims, 2 Drawing Figures

PATENTED JAN 14 1975  3,860,026
FIG.1
FIG.2
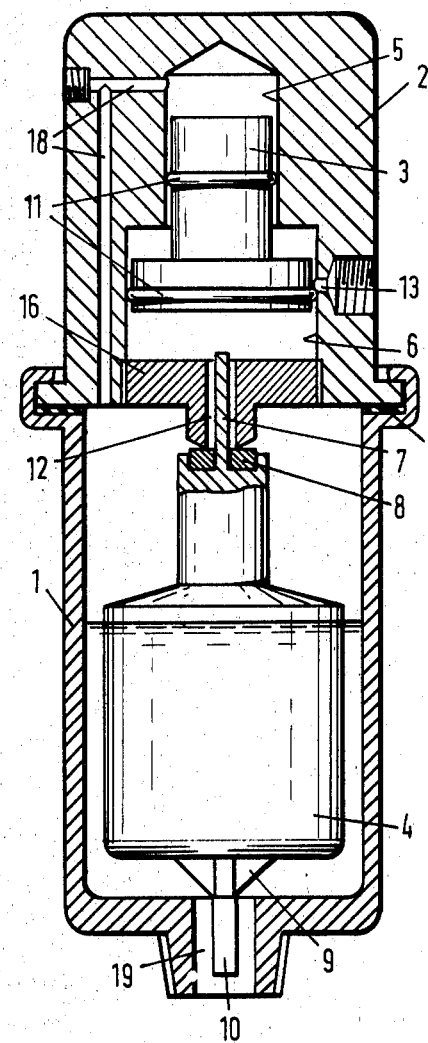
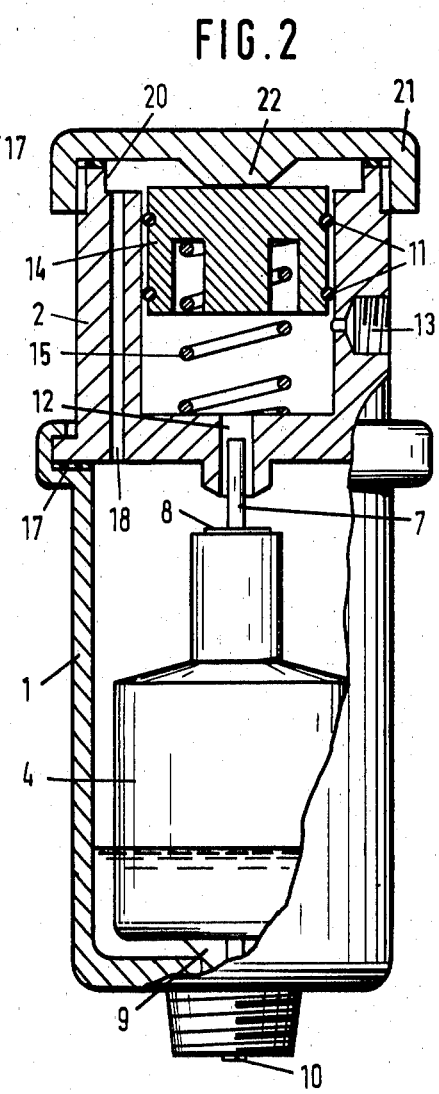

AUTOMATIC AIR VENT

This invention relates to automatic air vents for liquid-filled systems.

Such air vents are well-known, and comprise a housing having passages therethrough and incorporating therein a float chamber, and a float arranged for closing a passage in the housing under control of the liquid therein.

One of the drawbacks of these generally-known air vents is that, at high internal pressures, they either function incorrectly or do not function at all. This problem stems from the fact that at higher internal pressures, the difference between the internal pressure and external atmospheric pressure causes the valve member provided for closing-off a passage therein to be forced against its seat and, on reduction of the pressure of, for example, water in the system the weight of the float is insufficient to withdraw the valve member from its seat.

One solution proposed for solving this problem, i.e., the application of a system of levers to assist the valve to open has, in practice, given little improvement; and indeed the sensivity of the device to fail in operation is increased.

Another solution proposed to overcome the foregoingly stated problem, i.e., the use of a float having larger dimensions and weight, leads to unacceptable manufacturing costs.

It is an object of the present invention, therefore, to provide an air vent of the type previously described herein which operates efficiently at high pressures, and which eliminates the foregoing stated problem.

According to the present invention therefore, there is provided:

An automatic air vent for use in a liquid-filled system comprising a housing having passages therein and incorporating a float chamber, and a float in said chamber, arranged to close one of the said passages therein under the control of the said liquid; and in which there is further provided an auxiliary chamber, an intermediate passage between said auxiliary chamber and said float chamber, which said intermediate passage can be closed-off by a valve actuated by said float; a discharge orifice connected to the said auxiliary chamber; a piston accommodated in said auxiliary chamber, which said piston in a certain operative position thereof closes-off said discharge orifice; and in which on the side of said piston remote from said intermediate passage said auxiliary chamber is in permanent communication with said float chamber.

By virtue of this construction of the automatic air vent according to the present invention, the float operated valve member is more or less relieved of the influence of the pressure prevailing in the system.

In order to adapt the automatic air vent for operation from a certain superatmospheric pressure, the piston may take the form of a pressure differential piston, and the auxiliary chamber can have a form adapted to that of the differential piston. A corresponding operative result can be obtained when the piston is loaded with spring pressure on the side thereof adjacent the intermediate passage.

Automatically operating air vents of the last-mentioned kind has an advantage inasmuch that they can be employed at different heights of operation in, for example, central heating systems for tall buildings.

In another embodiment of the invention, the float is provided on the side adjacent the intermediate passage in the housing with a guide pin in co-operative association with said passage, a sealing ring being provided around said guide pin.

In yet another embodiment of the invention, the float is provided on the side away from the intermediate passage with a guide-pin in co-operative association with the adjacent passage in the housing, there being provided abutment members around said pin to prevent the float from closing the passage concerned.

The invention will be better understood from the following description read with reference to the accompanying drawings in which:

FIG. 1 illustrates a longitudinal cross-section of an automatically operating air vent depicted in the closed condition of operation.

FIG. 2 illustrates a longitudinal cross-section of another embodiment of the invention, and in which the automatically operating air vent is shown in the open condition of operation.

Referring in the first instance to FIG. 1, this figure shows an automatic air vent comprising a float chamber and, mounted thereon via a sealing member 17 an auxiliary chamber 2. Within the float chamber 1 a float 4 is arranged, the specific gravity of which float is less than that of the liquid filling the system in which the air vent is employed.

Float 4 is provided with a guide-pin 7 extending from the upper end thereof, and arranged to co-act with a bore 12 extending through a plug 16 screwed into the lower end of auxiliary chamber 2. Guide pin 4 is provided with an annular valve 8, instead of which may be used an O-ring. This valve 8 serves to efficiently seal float chamber 1 from auxiliary chamber 2 and viceversa.

Auxiliary chamber 2, closed at its lower end by plug 16, is divided into two adjoining sections 5 and 6 which are of different diameters.

A differential piston 3 is arranged within the auxiliary chamber 2, different portions of which differential piston 3 have diameters corresponding to the diameters of the adjoining sections 5 and 5 of auxiliary chamber 2. Each of the portions of differential piston 3 is provided with a circumferentially arranged O-ring 11, which sealingly engage the respective walls of sections 5 and 6 of the auxiliary chamber 2.

The auxiliary chamber 2 is provided with a passage 18 which interconnects the upper end of section 5 thereof with the float chamber 1, whilst the lower end of section 6 can connect with float chamber 1 via bore 12 extending through a plug 16. Auxiliary chamber 2 is provided with yet another passage 13 extending from section 6 thereof, and which passage 13 opens this section 6 to the atmosphere when the differential piston is in its upper most position.

At its bottom end float 4 is provided with a guide-pin 10 cooperating with inlet aperture 19 and with number of radially arranged fins 9 which extend vertically from the lower end thereof and which surround the guide-pin 10. These fins 9 are so arranged that, in the lower most position of float 4 the latter is prevented from fully closing-off the inlet aperture in the float chamber.

FIG. 2 illustrates another embodiment of the air vent according to the present invention, and in which parts thereof corresponding to parts in the embodiment of FIG. 1, have the same reference numerals. The second embodiment differs in essence only from that illustrated in FIG. 1 in that the differential piston 3 of FIG. 1 has been replaced by a normal piston 14 with a spring 15.

The constructions of the two embodiments differ further in that the auxiliary chamber 2 comprises a single section for the accommodation of the piston 14 and has a constant diameter throughout with the exception of an annular recess 20 at the upper end thereof having a greater diameter. This annular recess 20 is provided to effect connection between the upper end of auxiliary chamber 2 with float chamber 1 via passage 18.

In order that the pressure prevailing within the float chamber 1 can exercise an operative influence on the upper end of the piston 14, via the passage 18, the auxiliary chamber is provided with a cap 21 having a boss 22 extending from the under surface thereof to engage the top of the piston 14 in its upper most position.

The operation of the automatic relief-valve is now to be described with reference to FIG. 1. In it, float 4 is shown in its uppermost position. The level of the liquid in the system is shown as a horizontal line extending across the float chamber 1. In this uppermost position of float 4 the aperture 12 between float chamber 1 and auxiliary chamber 2 is closed-off by annular valve 8. Piston 3 assumes such a position that discharge orifice 13 is closed to the atmosphere. When the pressure in float chamber 1 increases, the pressure in section 5 above piston 14 will also increase and piston 14 will be forced downward until a condition of equilibrium in pressure is reached. When the pressure in float chamber 1 is decreased piston 14 will be forced upward until orifice 13 to atmosphere is opened, and the space beneath the piston 14 opened to atmosphere.

Should a leakage occur at the lower one of the O-rings 11, then the pressure beneath the piston 13 can decrease so that the piston 3 will assume too low a position. To prevent this piston 7 attached float 4 has such a length that, when piston 3 is in a very low position, pin 7 can be pushed down by the piston to open valve 8. As a result a portion of the air collected in the upper portion of float chamber 1, will stream through the valve to force piston 3 to move upward to assume a higher position.

When, via inlet orifice 19, air flows into float chamber 1, the level of the liquid therein will drop and float 4 will move downward, and as a result valve 8 will be opened. Consequently the pressure in section 6 of the auxiliary chamber 2 under the piston 3 will become equal to the pressure in float chamber 2, and as this equilibrium is being established the piston 3 will move upward until it moves clear of the discharge orifice and establishes communication with the atmosphere. Through the discharge of air liquid level in the float chamber and hence the float will rise, and as a consequence valve 8 will close-off passage 12 between float chamber 1 and chamber 2. As a result piston 3 will again descend until once again a condition of equilibrium in pressure is achieved.

The operation of the embodiment of FIG. 2 will be self-evident from the foregoing description of the operation of the embodiment of FIG. 1. When there is a state of equilibrium of pressures the downward force on the piston originating from pressure plus the weight of the piston is equal to the upward force exerted on the undersurface thereof by the pressure together with the force of the compression spring exerted on the piston.

When the liquid level in float chamber 1 falls, float 4 will move downwards and passage 12 between auxiliary chamber 2 and float chamber 1 will be opened. The air within the float chamber 1 will be released to the auxiliary chamber 2 under the piston 14, which will raise the pressure in it, and piston 14 will move upward to clear the discharge orifice 13, through which air will be discharged to atmosphere. Following this discharge, the liquid level in the float chamber and hence the float will rise and once again the discharge orifice will be closed off from the atmosphere.

It will be clear that the vents described may be used in systems employing a liquid other than water provided the float and piston are re-dimensioned.

The arrangement can also be adapted to function as a separator of liquids of different specific gravities for separation of the liquid having the lower specific gravity.

The device as described can, with the addition of suitable circuitry and signalling arrangement, be employed as an alarm system to indicate high or low water conditions.

Furthermore, the arrangements may be employed, when arranged upside down, as discharge or draining components in air or steam lines, and as separators of liquids of different specific gravities for separation of the liquid having the higher specific gravity.

It will be clear that many modifications can be made without departing from the scope of the invention as defined by the appended claims.

We claim:

1. An automatic air vent for use in a liquid-filled system comprising a housing having a float chamber, and a float in said chamber under the control of the said liquid; and in which there is further provided an auxiliary chamber, an intermediate passage in sealed relation between said auxiliary chamber and said float chamber, valve means actuated by said float for closing-off said intermediate passage; a discharge orifice connected to the said auxiliary chamber; a piston in said auxiliary chamber, which said piston in a certain operative position thereof closes off said discharge orifice; and in which on the side of said piston remove from said intermediate passage said auxiliary chamber is in permanent communication with said float chamber.

2. An automatic air vent as claimed in claim 1, in which said piston is in the form of a differential piston, and in which said auxiliary chamber has a form adapted to that of said differential piston.

3. An automatic air vent as claimed in claim 1 in which said piston is loaded with spring pressure on the side thereof adjacent said intermediate passage.

4. An automatic air vent as claimed in claim 1 in which said float is provided with a guide pin on the end thereof adjacent said intermediate passage, which guide pin is aligned with said intermediate passage for projection therethrough into said auxiliary chamber for engagement by said piston, and said valve means includes an annular sealing ring around said guide pin.

5. An automatic air vent for use in a liquid filled system, said air vent comprising a housing defining a lower float chamber and an auxiliary chamber overlying said float chamber, an inlet passage in said housing opening into said float chamber, an intermediate passage between an upper part of said float chamber and said auxiliary chamber, a float in said float chamber, valve means at least in part positionable by said float for closing said intermediate passage, a piston movably mounted in said auxiliary chamber and sealingly dividing said auxiliary chamber into first and second end portions, said intermediate passage opening into said first end portion, a vent passage through said housing from said first end portion in a position to be closed off by said piston, and a further passage between the upper part of said float chamber and said second end portion for providing a pressure reaction on said piston when said valve means are closed to close-off said vent passage.

6. An automatic air vent as claimed in claim 5 in which said inlet passage is an axial passage and directly underlies said float, and said float is provided with a guide pin on the end thereof remote from said intermediate passage, which guide pin is arranged to co-act with said inlet passage, and in which said guide pin is provided with abutment members arranged therearound to prevent said float from closing said inlet passage.

7. The air vent of claim 5 wherein said housing includes a first part defining said float chamber and a second part defining said auxiliary chamber, said first and second parts being in stacked relation, and means connecting together said first and second parts in sealed relation.

8. The air vent of claim 7 wherein a wall separates said float chamber and said auxiliary chamber, and said intermediate passage is through said wall.

9. The air vent of claim 5 wherein said intermediate passage is an axial passage and directly overlies said float.

10. The air vent of claim 5 wherein said inlet passage and said intermediate passages are vertically aligned, and said float has projecting guide pins extending into said inlet passage and said intermediate passage.

11. The air vent of claim 1 wherein all communications of said auxiliary chamber with said float chamber are above said float.

* * * * *